United States Patent
Popovich

Patent Number: 6,091,521
Date of Patent: Jul. 18, 2000

[54] LIGHT COLLECTION FROM DIFFRACTIVE DISPLAYS

[75] Inventor: Milan M. Popovich, Leicester, United Kingdom

[73] Assignee: DigiLens, Inc., Sunnyvale, Calif.

[21] Appl. No.: 09/418,152

[22] Filed: Oct. 13, 1999

Related U.S. Application Data

[60] Provisional application No. 60/104,610, Oct. 16, 1998.

[51] Int. Cl.$^7$ ....................................................... G02B 5/32
[52] U.S. Cl. .............................. 359/15; 359/22; 359/32; 359/33; 359/3; 359/613; 349/201; 349/202; 353/30; 353/31
[58] Field of Search ................................. 359/15, 22, 32, 359/33, 3, 7, 13, 24, 613, 567, 568; 349/201, 202, 10, 11; 353/30, 31

[56] References Cited

U.S. PATENT DOCUMENTS

| | | | |
|---|---|---|---|
| 5,745,203 | 4/1998 | Valliath et al. | 349/113 |
| 5,801,793 | 9/1998 | Faris et al. | 349/5 |
| 5,825,448 | 10/1998 | Bos et al. | 349/128 |
| 5,917,459 | 6/1999 | Son | 345/7 |

FOREIGN PATENT DOCUMENTS

| | | | |
|---|---|---|---|
| WO 97/35223 | 9/1997 | WIPO | G02B 27/01 |
| WO 98/04650 | 2/1998 | WIPO | C09K 19/00 |

*Primary Examiner*—Cassandra Spyrou
*Assistant Examiner*—Leo Boutsikaris
*Attorney, Agent, or Firm*—Law Offices of Terry McHugh; Thomas H. Ham

[57] ABSTRACT

A diffractive display system and a method of collecting first order light beams from a diffractive display of the system utilize holographic optical elements (HOEs) to deflect one of two first order diffracted light beams that emerge from each diffracting pixel of the diffractive display, so that the first order diffracted light beams can be separated from the zeroth order light beams. The utilization of the HOEs allows the system to be implemented in a compact optical configuration, without sacrificing any portion of the first order diffracted light. In a first embodiment, the system includes three HOEs that have static diffracting properties that are optimized for red, green and blue lights. For each set of light beams from a diffracting pixel of the diffractive display, the HOEs are holographically configured to deflect only one of the two first order diffracted light beams, such that the deflected first order light beam propagates in the same direction as the other non-deflected first order light beam. In a second embodiment, the system includes three HOEs that have reconfigurable diffracting properties that are also optimized for red, green and blue lights. In a third embodiment, the system further includes a holographic color filter that is comprised of three reconfigurable HOEs to sequentially illuminate the diffractive display with each of the tristimulus color lights.

21 Claims, 6 Drawing Sheets

LIGHT COLLECTION FROM DIFFRACTIVE DISPLAYS

This application claims the benefit of U.S. Provisional Application No. 60/104,610, filed Oct. 16, 1998.

TECHNICAL FIELD

The invention relates generally to diffractive display systems and more particularly to a diffractive display system that utilizes holographic optical elements.

DESCRIPTION OF THE RELATED ART

The use of displays based on diffractive principles is becoming more widespread. Such displays rely on switchable diffraction gratings or holograms as their basic functional element (pixel). An example of a display based on diffractive pixels is the Grating Light Valve (GLV) developed by Silicon Light Machines of California, U.S.A. The GLV utilizes pixels that contain deformable micromechanical gratings, which are controlled by electrostatic forces.

All diffractive displays require careful attention to the design of the illumination system. The basic optical design problem is to illuminate the displays at the correct angles for maximum efficiency and to separate out the zeroth order and unwanted diffracted components from the useful diffracted light.

FIG. 1 illustrates the basic concept of how a single diffracting pixel 10 of a diffractive display 12 based on thin holograms, or conventional diffraction gratings, would optically effect a single beam of light that is transmitted through the diffractive display. For a given incident beam 14, the emerging light has three main components: a zeroth order light beam 16 that propagates in the direction of the incident beam; and two first order (±1) diffracted light beams 18 and 20 which will normally carry the bulk of the diffracted light energy. The maximum diffraction efficiency in the first order is 33.8% for a sinusoidal profile and 40.4% for a square profile. There will also be higher order diffraction components, which normally represent a small proportion of the total diffracted light.

Conventionally, the zeroth order light beams and unwanted diffraction order light beams have been removed by optical stops, or by using more complex optical arrangements, for example, an optical arrangement based on schlieren spatial filtering. Such approaches, however, are difficult to implement in compact optical configurations. A more compact optical configuration may be achieved by implementing an approach that uses only one of the first order light beams from each diffracting pixel of the display by discarding the other first order light beam. However, such an approach would result in a 50% loss of the useful first order diffracted light.

In light of the above-described concern, what is needed is a compact diffractive display system and a method that facilitates collection of both first order light beams that emerge from each diffracting pixel of a diffractive display in a non-complex optical arrangement, as well as separation of these first order light beams from the zeroth order light beams.

SUMMARY OF THE INVENTION

A diffractive display system and a method of collecting first order light beams from a diffractive display of the system utilize holographic optical elements (HOEs) to deflect one of two first order diffracted light beams that emerge from each diffracting pixel of the diffractive display, so that the first order diffracted light beams can be separated from the zeroth order light beams. The utilization of the HOEs allows the system to be implemented in a compact optical configuration, without sacrificing any portion of the first order diffracted light. The diffractive display system may be configured to display an image on a screen by projecting the first order diffracted light onto a screen. In an alternative configuration, the first order diffracted light can be transmitted to one or more eyepiece optics to display the image in a virtual form.

In a first embodiment, the diffractive display system includes a light source, a beamsplitter, the diffractive display and a hologram stack. The light source can be any type of light source that generates high intensity white light. The light source may also be a type that provides sequential color illumination, which eliminates the need for a color filter to display color images. As an example, the light source may be based on light emitting diodes or solid state lasers. The diffractive display may be a conventional display that utilizes switchable diffraction gratings or holograms. For example, the diffractive display may be based on pixels containing deformable micro-mechanical gratings, which are controlled by electrostatic forces.

The hologram stack of the system includes three HOEs having static diffracting properties that are optimized for red, green and blue wavelength bands. The HOEs are preferably Bragg-type holograms, having a high diffraction efficiency. Each of the HOEs has recorded interference fringes to deflect one of two first order diffracted light beams that emerge from each diffracting pixel of the diffractive display, so that the deflected first order light beam propagates in the same direction as the other non-deflected first order light beam. The HOEs may be holographically configured to deflect either the (+1) first order light beam or the (−1) first order light beam.

In operation, the light source generates white illumination light that is directed to the diffractive display by the beamsplitter. For each diffracting pixel of the diffractive display, a zeroth order light beam and two first order diffracted light beams emerge in response to an incident light beam. These beams from the diffractive display propagate to the hologram stack. Depending on the wavelengths of these beams, the HOE of the hologram stack that has been configured to optically manipulate light having such wavelengths deflects one of the first order diffracted light beams from each diffracting pixel of the diffractive display. The deflected first order light beams and the other non-deflected first order light beams can then be used to form an image on a screen or a virtual image on one or more eyepiece optics. The zeroth order light beams can be removed by an optical stop, so that these zeroth order light beams do not interfere with the first order light beams.

In a second embodiment of the invention, the HOEs that are included in the hologram stack are reconfigurable HOEs.

Reconfigurable HOEs are optical elements having recorded interference fringes that can change their optical properties in response to an applied electrical field. Each reconfigurable HOE of the hologram stack includes a hologram that is sandwiched between two electrode layers. The hologram is a holographic photopolymeric film that has been combined with liquid crystal. The presence of the liquid crystal allows the hologram to exhibit optical characteristics that are dependent on an applied electrical field. Preferably, the hologram is a Bragg-type hologram, having a high diffraction efficiency. The electrode layers may be made of Indium Tin Oxide (ITO), which typically has a transmission efficiency of greater than 80%. In fact, it is possible to achieve transmission efficiencies in excess of 95% if the ITO electrode layers are coated with state of the art anti-reflection material.

The reconfigurable HOE has at least two optical operating states, a diffractive state and a passive state. The diffractive properties of the reconfigurable HOE primarily depend on the recorded holographic fringes in the photopolymeric film. In the diffractive state, the reconfigurable HOE diffracts propagating light in a predefined manner. In the passive state, the reconfigurable HOE does not optically alter the propagating light. Initially, the hologram of the reconfigurable HOE is in the diffractive state, such that received light is diffracted in the predefined manner. However, when an electrical field is generated in the hologram by applying voltage to the electrode layers of the reconfigurable HOE, the operating state of the hologram switches from the diffractive state to the passive state.

Each of these reconfigurable HOEs is configured to be selective to light of a particular tristimulus color. In a preferred embodiment, the hologram stack includes three reconfigurable HOEs that are sensitive to red, green and blue light. By sequentially activating the reconfigurable HOEs of the hologram stack to the diffractive state one at a time, the first order diffracted light beams can be sequentially deflected in accordance with their wavelengths, i.e., color. The use of the reconfigurable HOEs in this manner substantially eliminates potential cross-talk between the red, green and blue HOEs of the hologram stack.

In a third embodiment, the diffractive display system includes a holographic color filter that operates to sequentially filter the white illumination light generated by the light source. In this embodiment, the diffractive display is assumed to be a type that requires sequential illumination by tristimulus color lights for color display. The holographic color filter is structurally similar to the hologram stack in accordance with the second embodiment. The number of reconfigurable HOEs in the holographic color filter depends on whether the filter is a transmission type or a reflection type. If the holographic color filter is a transmission type, the filter would typically include one reconfigurable HOE for each of the tristimulus colors. Thus, the holographic color filter would include three reconfigurable HOEs. If the holographic color filter is a reflection type, the filter may need additional reconfigurable HOEs, because of the intrinsically narrower bandwidths of reflection holograms. For example, to cover the visible band, it may be necessary to have two reconfigurable HOEs for each of the tristimulus colors. In this example, the reflection-type holographic color filter would include a total of six reconfigurable HOEs. Each of the reconfigurable HOEs of the filter includes a hologram that is positioned between a pair of electrodes. These holograms have recorded interference fringes that are selective to wavelength bands, so that each reconfigurable HOE can selectively filter the white light generated by the light source to transmit only one particular tristimulus color light to the diffractive display. By activating the reconfigurable HOEs to the diffractive state one at a time, the holographic color filter can sequentially illuminate the diffractive display by each of the tristimulus color lights to generate a color image.

DETAILED DESCRIPTION

Figure 2:
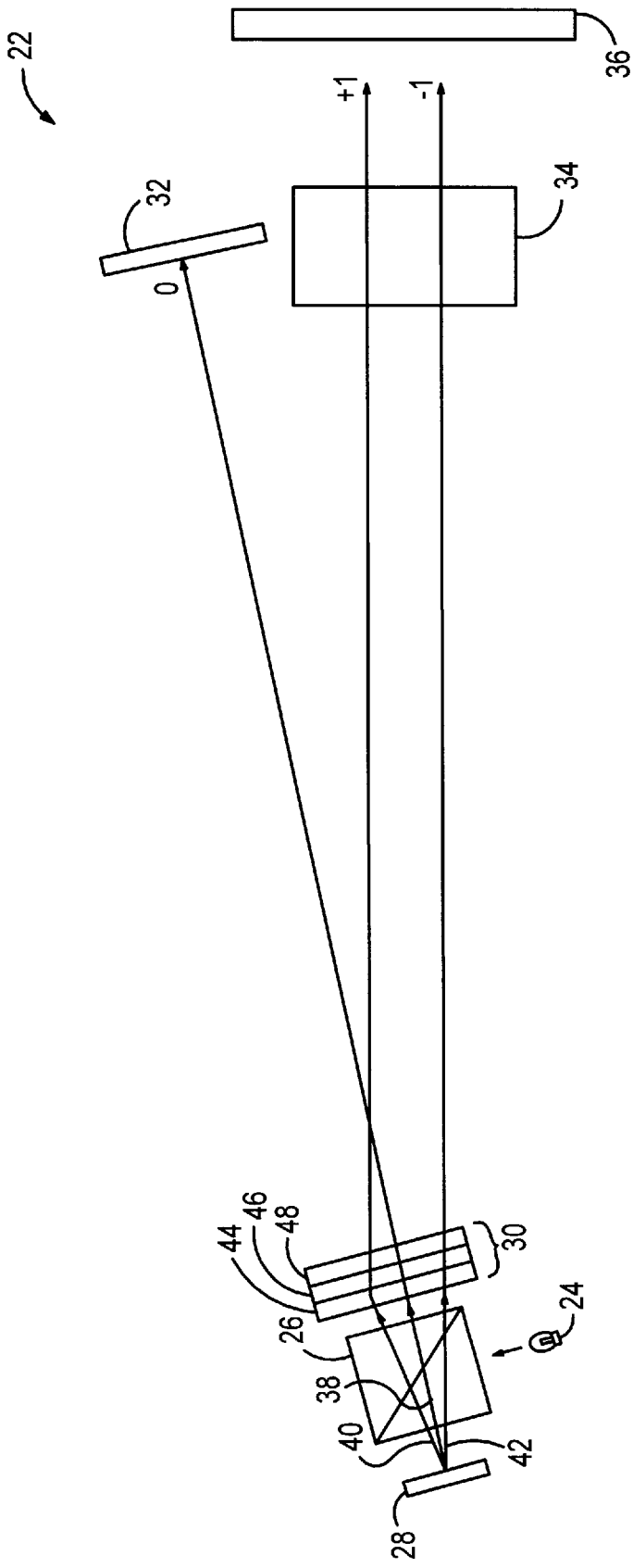
FIG. 2 is a schematic diagram of a diffractive display system in accordance a first embodiment of the invention.

With reference to FIG. 2, a diffractive display system 22 in accordance with a first embodiment of the invention is shown. The diffractive display system includes a light source 24, a beamsplitter 26, a diffractive display 28, and a hologram stack 30, which are arranged in a compact optical configuration. The diffractive display system may include other components conventionally used in illumination systems, such as a condenser lens, heat rejection filters, etc. For simplification, these components are not shown in this embodiment, as well as other embodiments described below. As shown, the diffractive display system further includes an optical stop 32, projection optics 34 and a screen 36. However, in an alternative application, the projection optics and the screen may be replaced by one or more eyepiece optics (not shown) to display the image generated by the diffractive display 28. The diffractive display system operates to selectively manipulate light beams from the diffractive display, such that the zeroth order light beams are separated from the useful first order diffracted light beams. The separated first order diffracted light beams are then used to form a displayed image.

The light source 24 of the system 22 may be any type of high intensity white light source that is currently used in projectors. Alternatively, the light source may be a white light source based on light emitting diodes or solid state lasers. The light source is positioned to illuminate the diffractive display 28 via the beamsplitter 26. The beamsplitter is optically designed to redirect the light from the light source to the diffractive display, while allowing light from the diffractive display to propagate to the hologram stack 30. As an alternative to using the beamsplitter, it is also possible to separate the incident and diffracted light by positioning the light source such that the illumination light is incident on the surface of the diffractive display 28 at an off-axis. In this alternative arrangement, the light source is positioned relative to the diffractive display so that the illumination light arrives at the diffractive display directly from the light source, i.e., without being transmitted through the beamsplitter. However, the use of the beamsplitter is preferred since it allows a more compact solution than the alternative arrangement.

Figure 1:
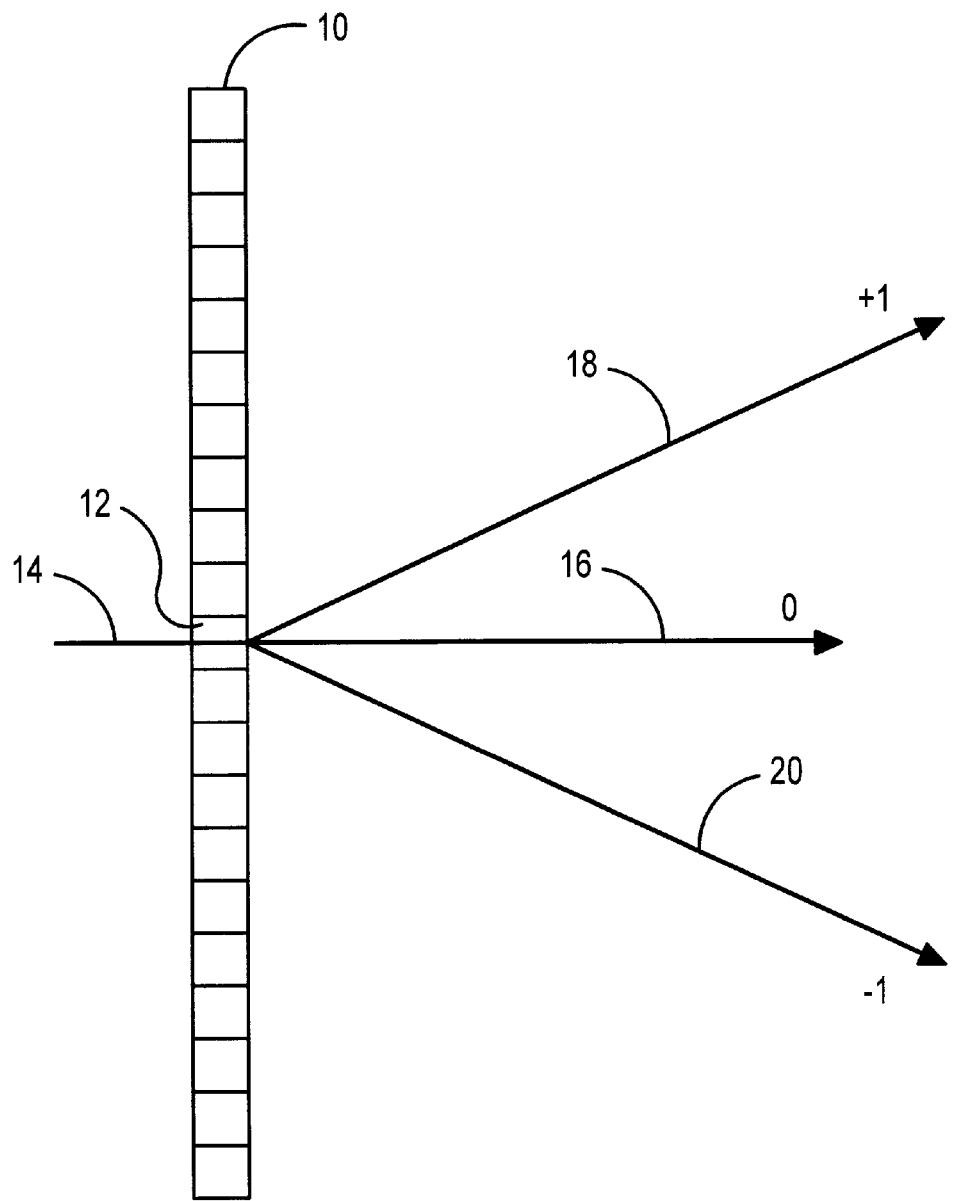
FIG. 1 is a schematic diagram showing the effect of a single diffracting pixel of a conventional diffractive display on an incident light beam, illustrating a zeroth order light beam and two first order light beams that are produced by the diffracting pixel of the diffractive display.

The diffractive display 28 of the system 22 may be a type of display that relies on holograms or switchable diffraction gratings, such as the GLV of Silicon Light Machines. The exact type of the diffractive display is not critical to the invention. However, if the diffractive display requires sequential illumination of tristimulus color lights, i.e., red, green and blue lights, to generate a color input image, the diffractive display system would typically require a color filter (not shown) located between the white light source 24 and the diffractive display. The color filter may be a conventional rotating RGB filter disk. In an alternative arrangement, the color filter may be based on reconfigurable holographic optical elements, which will be described below in reference to FIG. 5. As previously described in reference to FIG. 1, each diffracting pixel of the diffractive display 28 generates a zeroth order light beam 38, a first order (+1) light beam 40, a first order (-1) light beam 42, and higher order light beams (not shown) in response to an incident light beam during the operation of the system.

The hologram stack 30 of the system 22 includes three transmissive holographic optical elements (HOEs) 44, 46 and 48 having static diffracting properties that are optimized for red, green and blue wavelength bands, respectively. That is, each HOE of the hologram stack has been recorded with interference fringes to optically manipulate light beams of a particular tristimulus color. The HOEs are preferably Bragg-type holograms, having a high diffraction efficiency. For each set of light beams from a diffracting pixel of the diffractive display 28, the HOEs are holographically configured to deflect only one of the two first order light beams, such that the deflected first order light beam propagates in the same direction as the other non-deflected first order light beam. Depending on the color (wavelength) of the light beams, an HOE of the hologram stack that has been configured to be sensitive to that color will actively deflect one of the two first order light beams. In FIG. 2, the first order (+1) light beam 40 is shown to be deflected by one of the HOEs of the hologram stack. However, the diffractive display system 22 can be reconfigured so that the first order (-1) light beam 42 is deflected by the hologram stack. Which first order light beam that is deflected by the hologram stack is not critical to the invention. Consequently, both first order light beams propagate in the same direction, as they emerge from the hologram stack. The diffracted first order beams can then be optically separated from the zeroth order beam 38. In this manner, both first order light beams that are generated by each diffracting pixel of the diffractive display 28 are used by the display system 22, instead of just one beam from the pair of first order light beams. In an alternative configuration, the HOEs 44, 46 and 48 of the hologram stack 30 may be reflective HOEs, instead of transmissive HOEs. However, the fundamental operation of a hologram stack, in which one of the first order light beams is first deflected and then the first order light beams are optically separated from the zeroth order light beam, remains the same for this alternative configuration.

The optical stop 32, also known as a baffle, of the system 22 is optically positioned to receive the zeroth order light beam 38 from the hologram stack 30. The optical stop serves to absorb the unwanted diffracted light, i.e., the zeroth order light beam, or to deflected the unwanted diffracted light, so that it is not transmitted to the screen 36. The optical stop may be a blackened sheet of metal for light absorption, or a sheet of metal having a highly reflective surface for light deflection.

In contrast, the projection optics 34 of the system 22 are optically positioned to receive both first order light beams 40 and 42 from the hologram stack 30 to relay these light beams to the screen 36. The projection optics may include one or more lenses (not shown) to magnify and/or focus the propagating light beams from the hologram stack to the screen. Therefore, only the useful light beams, i.e., the first order light beams, are relayed to the screen, while the unwanted light, i.e., the zeroth order light beam, is selectively discarded.

Figure 3:
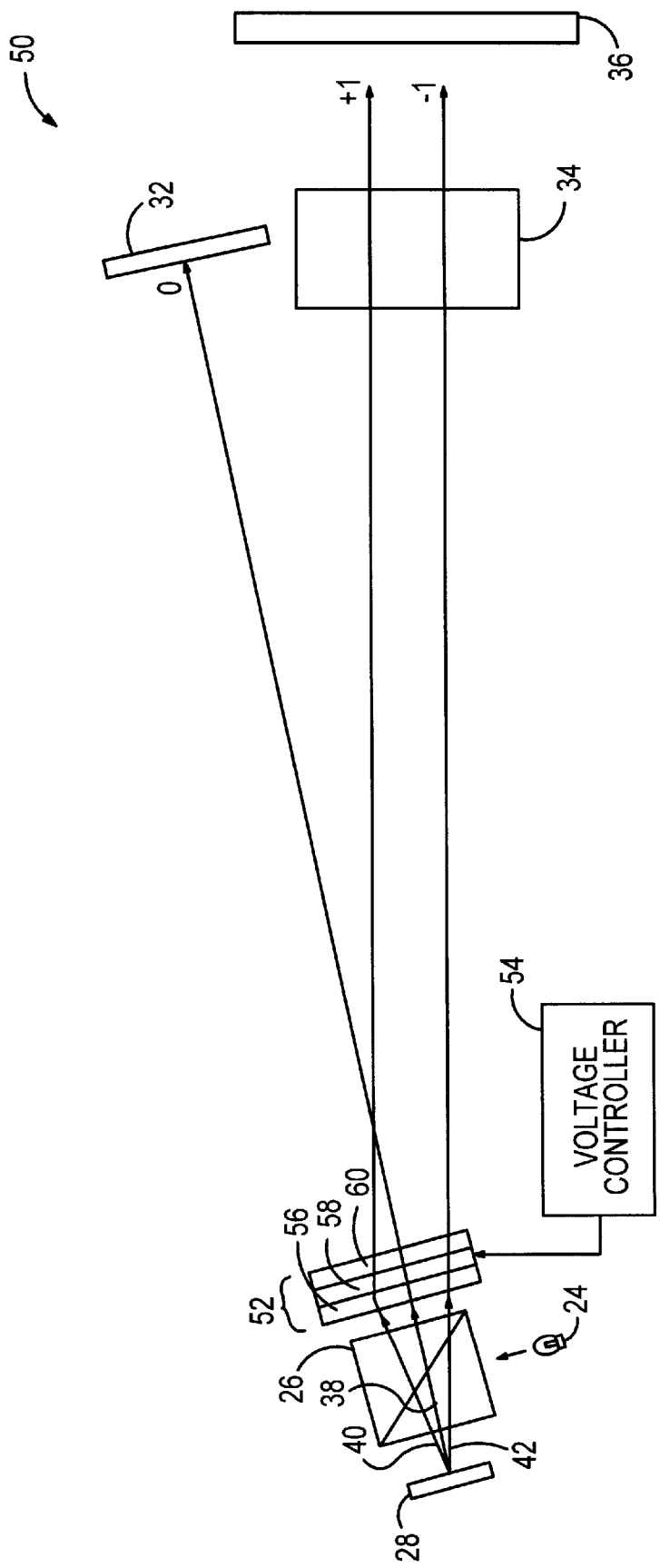
FIG. 3 is a schematic diagram of a diffractive display system in accordance with a second embodiment of the invention.

Turning now to FIG. 3, a diffractive display system 50 in accordance with a second embodiment of the invention is shown. The same reference numerals of FIG. 2 will be used for the same components illustrated in FIG. 3. The diffractive display system 50 includes the light source 24, the beamsplitter 26, the diffractive display 28, a switchable hologram stack 52, a voltage controller 54, the optical stop 32, the projection optics 34, and the screen 36.

Figure 4:
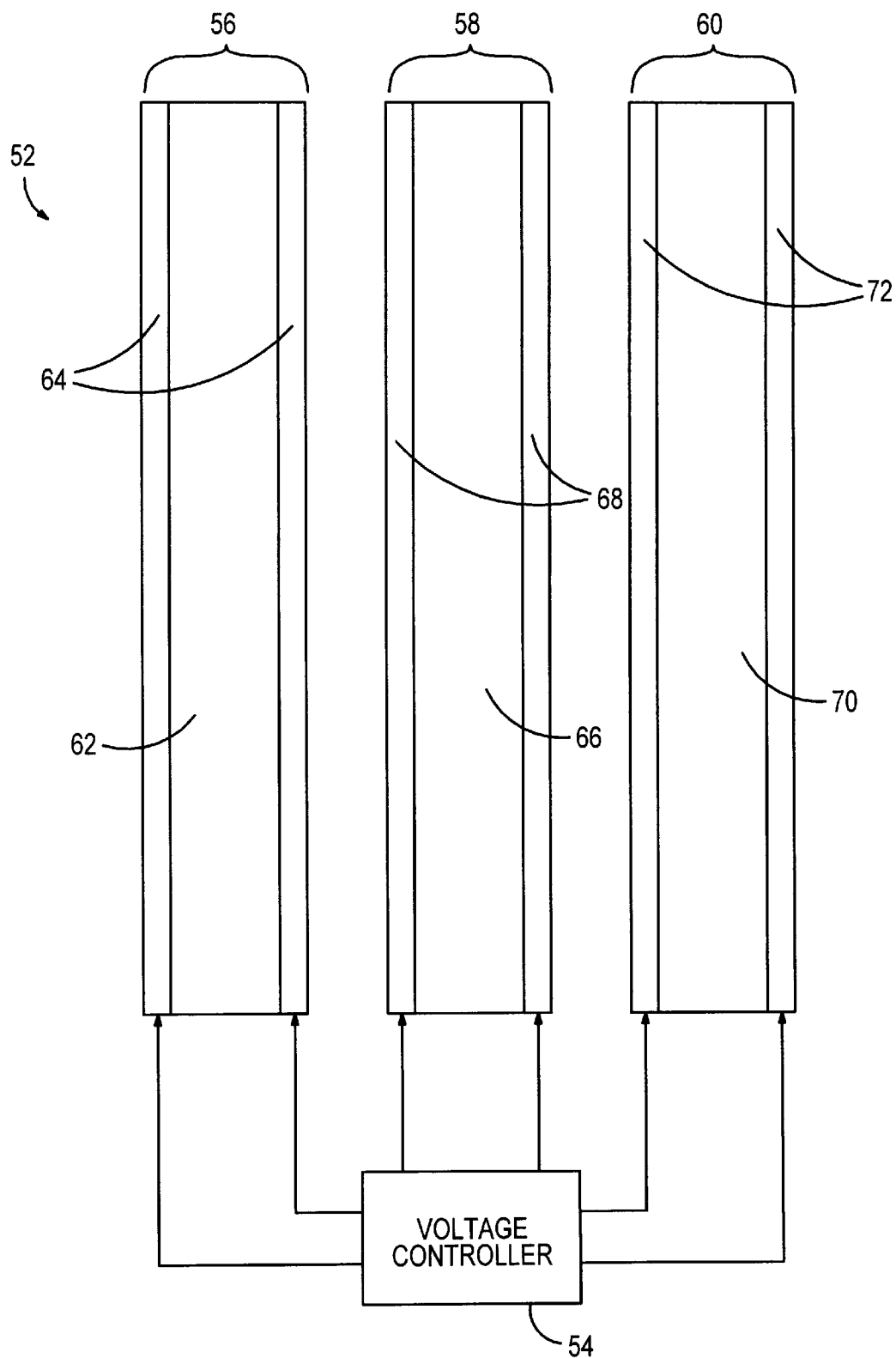
FIG. 4 is a schematic diagram of a switchable hologram stack included in the diffractive display system of FIG. 3.

The switchable hologram stack 52 and the voltage controller 54 of the system 50 will be described with references to FIGS. 3 and 4. The switchable hologram stack includes three reconfigurable HOEs 56, 58 and 60. The reconfigurable HOE 56 includes a hologram 62 that is sandwiched between a pair of electrodes 64. Similarly, the reconfigurable HOE 58 includes a hologram 66 between a pair of electrodes 68, and the reconfigurable able HOE 60 includes a hologram 70 between another pair of electrodes 72. Each hologram is preferably a Bragg-type hologram, having a high diffraction efficiency. The holograms are holographic photopolymeric films that have been combined with liquid crystal. As an example, the photopolymeric film may be composed of a polymerizable monomer having dipentaerythritol hydroxypentacrylate, as described in PCT Application No. PCT/US97/12577 by Sutherland et al. The liquid crystal may be suffused into the pores of the photopolymeric film. The holographic fringes may be recorded into the photopolymeric film either prior to or after being combined with the liquid crystal. In the preferred embodiment, the photopolymeric material is combined with the liquid crystal prior to a recording. In this preferred embodiment, the liquid crystal and the polymer material are pre-mixed and the phase separation takes place during the recording of the hologram, such that the holographic fringes become populated with a high concentration of liquid crystal droplets. This process can be regarded as a "dry" process, which is advantageous in terms of mass production of the reconfigurable HOEs.

Recording of the holograms 62, 66 and 70 can be accomplished by a traditional optical process in which interference fringes are created by applying beams of light. Alternatively, the interference fringes may be artificially created by using highly accurate laser writing devices or other optical replication techniques. The electrode layers 64, 68 and 72 that are adjacent to the holograms are made of a transparent conductive material. As an example, the electrode layers may be made of Indium Tin Oxide (ITO), which usually has a transmission efficiency of greater than 80%. Furthermore, these ITO electrode layers may be coated with state of the art anti-reflection material to achieve transmission efficiencies in excess of 95%. An electrical field is generated within the hologram when a potential difference is applied to the electrode layers by the voltage controller.

The reconfigurable HOEs 56, 58 and 60 of the hologram stack 52 have at least two optically operating states, a diffractive state and a passive state. The optical properties of the reconfigurable HOEs primarily depend on the recorded holographic fringes in the photopolymeric film. In the diffractive state, the reconfigurable HOEs diffract propagating light in a predefined manner. In the passive state, the reconfigurable HOEs do not optically alter the propagating light. Initially, each hologram of the reconfigurable HOEs is in the diffractive state, such that incident light is diffracted. However, when an electrical field is created within one of the holograms 62, 66 and 70 of the reconfigurable HOEs by applying voltage to the electrode layers 64, 68 or 70, the optical state of that hologram switches from the diffractive state to the passive state.

Each of the holograms 62, 66 and 70 is holographically configured such that only a particular monochromatic light is diffracted by that hologram. The hologram 62 is designed to be sensitive to a wavelength band associated with red light. The hologram 66 is designed to be sensitive to a wavelength band associated with green light, while the hologram 70 is designed to be sensitive to a wavelength associated with blue light. The electrodes 64, 68 and 72 of the reconfigurable HOEs are individually coupled to the voltage controller 54. The voltage controller selectively provides an excitation signal to the electrodes of a selected reconfigurable HOE, switching the hologram of that reconfigurable HOE from the diffractive state to the passive state. The hologram in the passive state can then be switched to the diffractive state by removing the voltage to the electrodes.

In operation, the selective switching of the reconfigurable HOEs 56, 58 and 60 of the hologram stack 52 between the diffractive and passive states is synchronized with the diffractive display 28. That is, for a single color input image displayed by the diffractive display, each of the reconfigurable HOEs in the hologram stack is switched once to the diffractive state by the voltage controller 54. For example, during a period when a frame of a color image is displayed by the diffractive display, the reconfigurable HOEs may be sequentially switched to the diffractive state one at a time by the voltage controller, so that the order of color lights transmitted through the switchable hologram stack is red, green and blue. The use of the reconfigurable HOEs in the above-described manner substantially eliminates potential cross-talk between the red, green and blue HOEs.

Figure 5:
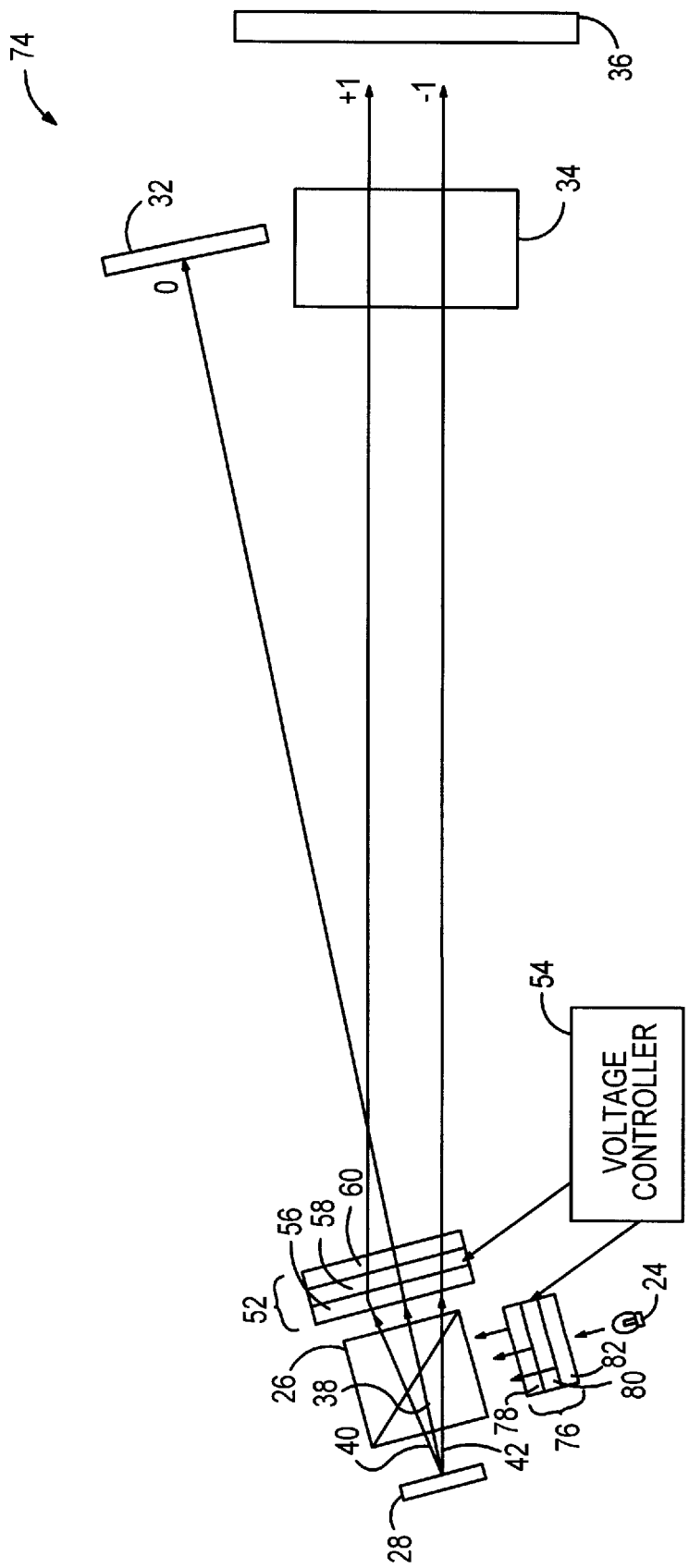
FIG. 5 is a schematic diagram of a diffractive display system in accordance with a third embodiment of the invention.

With reference to FIG. 5, a diffractive display system 74 in accordance with a third embodiment is shown. The diffractive display system 74 includes all of the components of the diffractive display system 50 of FIG. 3. However, in this embodiment, the diffractive display system 74 further includes a holographic color filter 76 that operates to sequentially filter the white light generated by the light source 76. The diffractive display 28 of the system 74 is assumed be of a type that requires sequential illumination by tristimulus color lights for color display.

The holographic color filter 76 is structurally similar to the switchable hologram stack 52. As an alternative to using the beamsplitter, it is also possible to separate the incident and diffracted light by positioning the light source such that the illumination light is incident on the surface of the diffractive display 28 at an off-axis. In this alternative arrangement, the light source is positioned relative to the diffractive display so that the illumination light arrives at the diffractive display directly from the light source, i.e., without being transmitted through the beamsplitter. However, the use of the beamsplitter is preferred since it allows a more compact solution than the alternative arrangement. As such, the holographic color filter includes three reconfigurable HOEs 78, 80 and 82. Each of the reconfigurable HOEs includes a hologram (not shown) that is positioned between a pair of electrodes (not shown). These holograms of the reconfigurable HOEs have recorded interference fringes that are selective to wavelength bands, so that each reconfigurable HOE can selectively filter the white light generated by the light source 24 to transmit only one particular tristimulus color light to the diffractive display 28. As an example, the reconfigurable HOEs 78, 80 and 82 may be configured to be sensitive to red, green and blue lights, respectively. The holographic color filter is operatively connected to the voltage controller 54 that controls the diffractive states of the reconfigurable HOEs of the holographic color filter.

In operation, the selective switching of the reconfigurable HOEs 78, 80 and 82 of the color filter 76 between the diffractive and passive states is synchronized to that of the reconfigurable HOEs 56, 58 and 60 of the switchable hologram stack 52 by the voltage controller 54. When a particular color-sensitive reconfigurable HOE of the hologram stack is switched to the diffractive state, the reconfigurable HOE of the color filter that is sensitive to that color is also switched to the diffractive state. Thus, the reconfigurable HOE 78 of the color filter is switched to the diffractive state only when the reconfigurable HOE 56 of the hologram stack is switched to the diffractive state, since both of theses reconfigurable HOEs are color sensitive to red light. Similarly, the optical states of the reconfigurable HOEs 78 and 80 of the color filter are dependent on the optical states of the reconfigurable HOEs 58 and 60 of the hologram stack, respectively.

Figure 6:
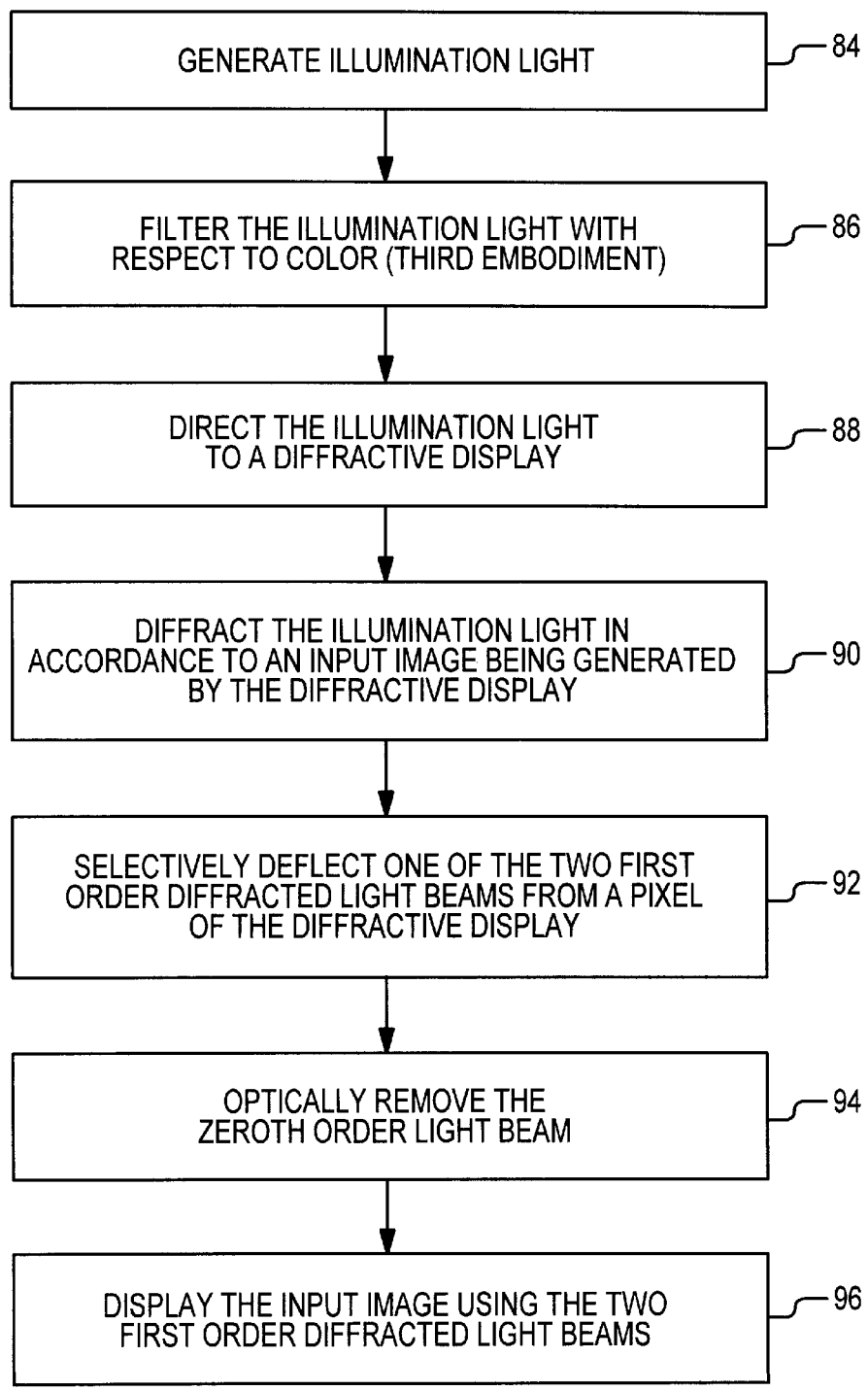
FIG. 6 is a flow diagram of a method of collecting first order light beams from a diffractive display in accordance with the invention.

A method of collecting useful diffracted light beams from a diffractive display will be described with reference to FIG. 6. Initially, high intensity white illumination light is generated by a light source, during step 84. The illumination light may then be filtered by a holographic color filter to transmit one of tristimulus color lights, during step 86. Step 86 is only applicable if the diffractive display is a type that requires sequential illumination of tristimulus color lights for color display (third embodiment of the invention). During step 88, the illumination light is optically directed to the diffractive display by a beamsplitter. Next, during step 90, the illumination light is diffracted by the diffractive display to generate an input image. For each diffracting pixel of the diffractive display, the diffraction of the illumination light gives rise to two first order light beams and a zeroth order light beam. During step 92, one of the two first order light beams from each diffracting pixel of the diffractive display is selectively deflected by a hologram stack that includes three color-sensitive Bragg-type HOEs. In an alternative embodiment, the HOEs may be reconfigurable HOEs having optical properties that are responsive to an applied electrical field. The zeroth order light beam is then optically removed by an optical stop, during step 94. The deflected first order light beams and the non-deflected first order light beams are used to display the input image generated by the diffractive display, during step 96.

What is claimed is:

1. A method of collecting useful diffracted light beams from a diffractive display comprising steps of:
   providing illumination light to said diffractive display;
   diffracting said illumination light by said diffractive display to provide a zeroth order light beam and two first order light beams from a pixel of said diffractive display;
   selectively deflecting one of said two first order light beams such that both of said two first order light beams from said pixel of said diffractive display are propagated in a substantially same direction; and
   displaying said two first order light beams to present an image that is partially formed by said two first order light beams.

2. The method of claim 1 wherein said step of selectively deflecting a first one of said two first order light beams includes a step of holographically diffracting said first one by transmitting said first one through a holographic optical element.

3. The method of claim 2 wherein said step of holographically diffracting said first one of said two first order light beams is a step of holographically diffracting said first one by transmitting said first one through a color-sensitive Bragg-type holographic optical element.

4. The method of claim 3 wherein said step of transmitting said first one of said two first order light beams is a step of transmitting said first one through three color-sensitive Bragg-type holographic optical elements, each of said color-sensitive Bragg-type holographic optical elements being selective to a particular tristimulus color light.

5. The method of claim 2 wherein said step of holographically diffracting said first one of said two first order light beams is a step of holographically diffracting said first one by transmitting said first one through a reconfigurable holographic optical element that has been activated to a diffractive state, said holographic optical element having an optical state that is responsive to an applied electrical field.

6. The method of claim 5 wherein said step of holographically diffracting said first one of said two first order light beams is a step of holographically diffracting said first one by transmitting said first one through a color-sensitive Bragg-type reconfigurable holographic optical element that has been activated to said diffractive state, said color-sensitive Bragg-type reconfigurable holographic optical element having recorded interference fringes that are configured to be color selective with respect to diffraction.

7. The method of claim 1 wherein said step of providing said illumination light includes a step of filtering said illumination light with respect to wavelength by transmitting said illumination light through color-sensitive reconfigurable holographic optical elements, including sequentially activating one of said color-sensitive reconfigurable holographic optical elements to a diffractive state, said color-sensitive reconfigurable holographic optical elements having optical states that are responsive to an applied electrical field.

8. The method of claim 1 further comprising a step of optically removing said zeroth order light beam so that said zeroth order light beam is not displayed along with said two first order light beams.

9. The method of claim 1 wherein said step of providing said illumination light includes a step of generating high intensity white light to illuminate said diffractive display.

10. A diffractive display system comprising:
    light emitting means for providing illumination light;
    image generating means optically coupled to said light emitting means to receive said illumination light for diffracting said illumination light such that, for each beam of said illumination light that is diffracted, a zeroth order light beam and two first order light beams are produced;
    collecting means optically coupled to said image generating means for deflecting at least one of said two first order light beams such that both of said two first order light beams are propagated in a substantially same direction; and
    displaying means optically coupled to said collecting means for visually presenting an image that is partially formed of said two first order light beams.

11. The diffractive display system of claim 10 wherein said collecting means includes a holographic optical element having recorded interference fringes to deflect a first one of said two first order light beams by diffraction such that both of said two first order light beams are propagated in said substantially same direction.

12. The diffractive display system of claim 11 wherein said holographic optical element of said collecting means is a color-sensitive Bragg-type holographic optical element.

13. The diffractive display system of claim 11 wherein said holographic optical element of said collecting means is a reconfigurable holographic optical element, said reconfigurable holographic optical element including a hologram that is configured to diffract said first one of said two first order light beams when said hologram is in a diffractive state, said diffractive state of said hologram being responsive to an applied electrical field.

14. The diffractive display system of claim 13 wherein said hologram of said reconfigurable holographic optical element includes recorded interference fringes to optically manipulate only a particular tristimulus color light when said hologram is in said diffractive state.

15. The diffractive display system of claim 13 wherein said reconfigurable holographic optical element includes a polymerizable monomer having dipentaerythritol hydroxypentacrylate that is combined with liquid crystal.

16. The diffractive display system of claim 11 further comprising a holographic color filter optically coupled to said light emitting means to receive said illumination light, said holographic color filter including a plurality of reconfigurable holographic optical elements, said reconfigurable holographic optical elements having optical properties that are responsive to an applied electrical field, each of said reconfigurable holographic optical elements being configured to transmit light of a particular color.

17. A method of separating first order diffracted light beams from zeroth order light beams that emerge from a diffractive display comprising steps of:

transmitting illumination light from a light source to said diffractive display;

diffracting said illumination light by said diffractive display so that, for each diffracting pixel of said diffractive display, a zeroth order light beam and two first order light beams are generated; and selectively deflecting a first one of said two first order light beams by holographically diffracting one of said two first order light beams using a holographic optical element such that both of said two first order light beams are propagated in a substantially same direction.

18. The method of claim 17 wherein said step of selectively deflecting said first one of said two first order light beams includes a step of transmitting said first one through a color-sensitive Bragg-type holographic optical element to effectuate said deflection.

19. The method of claim 17 wherein said step of selectively deflecting said first one of said two first order light beams includes a step of transmitting said first one through a reconfigurable holographic optical element that has been activated to a diffractive state, said reconfigurable holographic optical element having an optical state that is responsive to an applied electrical field.

20. The method of claim 19 wherein said step of transmitting said first one of said two first order light beams through said reconfigurable holographic optical element is a step of transmitting said first one through a color-sensitive Bragg-type reconfigurable holographic optical element that has been activated to said diffractive state, said color-sensitive Bragg-type reconfigurable holographic optical element having recorded interference fringes that are configured to be color selective with respect to diffraction.

21. The method of claim 17 further comprising a step of filtering said illumination light from said light source by transmitting said illumination light through color-sensitive reconfigurable holographic optical elements, including sequentially activating said color-sensitive reconfigurable holographic optical elements to a diffractive state from a passive state so that said diffractive display is sequentially illuminated by different tristimulus color lights, said color-sensitive reconfigurable holographic optical elements having optical states that are responsive to an applied electrical field.

* * * * *